United States Patent
Patlolla

(10) Patent No.: US 12,257,743 B2
(45) Date of Patent: Mar. 25, 2025

(54) SYSTEM AND METHOD FOR CONVERTING RECYCLED CARBON FIBER INTO DENSIFIED FIBERS

(71) Applicant: Shocker Composites, LLC, Wichita, KS (US)

(72) Inventor: Vamsidhar Patlolla, Wichita, KS (US)

(73) Assignee: Shocker Composites, LLC, Wichita, KS (US)

(*) Notice: Subject to any disclaimer, the term of this patent is extended or adjusted under 35 U.S.C. 154(b) by 1144 days.

(21) Appl. No.: 16/967,336

(22) PCT Filed: Feb. 12, 2019

(86) PCT No.: PCT/US2019/017613
§ 371 (c)(1),
(2) Date: Aug. 4, 2020

(87) PCT Pub. No.: WO2019/157490
PCT Pub. Date: Aug. 15, 2019

(65) Prior Publication Data
US 2021/0031409 A1    Feb. 4, 2021

Related U.S. Application Data

(60) Provisional application No. 62/629,328, filed on Feb. 12, 2018.

(51) Int. Cl.
B29B 17/00 (2006.01)
B29B 7/90 (2006.01)
(Continued)

(52) U.S. Cl.
CPC .......... B29B 17/0412 (2013.01); B29B 7/905 (2013.01); B29B 17/0026 (2013.01);
(Continued)

(58) Field of Classification Search
CPC ............ B29B 2017/0231; B29B 7/905; B29B 17/0026; B29B 2017/0224;
(Continued)

(56) References Cited

U.S. PATENT DOCUMENTS 2,936,487 A * 5/1960 Paz .......................... B29C 70/28
                                                425/332
5,578,535 A * 11/1996 Hill ......................... C03C 1/026
                                                106/600
(Continued)

FOREIGN PATENT DOCUMENTS

DE    3744728 A1    12/1988
DE    19514543 C1    3/1996
(Continued)

OTHER PUBLICATIONS

Phoenix Equipment Corporation—Phxequip, (Eirich Rv02e High Intensity Lab Mixer, https://www.phxequip.com/equipment.29751/eirich-rv02e-high-intensity-lab-mixer.aspx, Retrieved on Nov. 13, 2023) (Year: 2023).*

(Continued)

*Primary Examiner* — Matthew J Daniels
*Assistant Examiner* — Anna J. Perkins
(74) *Attorney, Agent, or Firm* — Burr & Forman LLP

(57) ABSTRACT

A system for densification of recycled pre-preg fibers may include a cutting device configured to receive the recycled pre-preg fibers having various lengths, and cut the recycled pre-preg fibers to produce cut fibers having a desired length, (Continued)

and a mixer configured to mix wetted, cut fibers to generate bound fibers having an increased bulk density relative to a bulk density of the cut fibers.

8 Claims, 5 Drawing Sheets

(51) Int. Cl.
  *B29B 17/02* (2006.01)
  *B29B 17/04* (2006.01)
  *B29K 105/08* (2006.01)
(52) U.S. Cl.
  CPC ...... *B29B 17/02* (2013.01); *B29B 2017/0224* (2013.01); *B29B 2017/0231* (2013.01); *B29B 2017/0436* (2013.01); *B29B 2017/0488* (2013.01); *B29K 2105/0872* (2013.01)
(58) Field of Classification Search
  CPC ....... B29B 17/0412; B29B 17/02; B29B 7/66; B29B 7/90; B29B 17/04; B29B 9/14; B29B 2009/125; B29B 9/06; B29B 9/08; B29K 2105/0872; B29K 2105/087; Y02W 30/52; Y02W 30/62; B29C 67/02; B01J 2/12; B01J 2/14; B01J 2/20; B01J 2/22
  See application file for complete search history.

(56) References Cited

U.S. PATENT DOCUMENTS

| | | | |
|---|---|---|---|
| 5,639,807 A | * | 6/1997 | Secrist .................. D01F 11/14 428/394 |
| 9,776,107 B1 | | 10/2017 | Asmatulu et al. |
| 2005/0214524 A1 | * | 9/2005 | Blanchard ................ C08K 7/14 428/325 |
| 2010/0092770 A1 | * | 4/2010 | Wadahara ............. B29C 70/025 156/278 |
| 2010/0267868 A1 | * | 10/2010 | Takahashi ............... B29B 17/02 524/79 |
| 2017/0081785 A1 | * | 3/2017 | Stonecipher ............ B29B 17/02 |
| 2017/0305038 A1 | | 10/2017 | Paspek et al. |

FOREIGN PATENT DOCUMENTS

| | | |
|---|---|---|
| EP | 3065936 A1 | 9/2016 |
| EP | 3181319 A1 | 6/2017 |
| JP | 2015077790 A | 4/2015 |

OTHER PUBLICATIONS

International Search Report and Written Opinion from related international application No. PCT/US2019/017613, all pages herein cited in its entirety.

* cited by examiner

SYSTEM AND METHOD FOR CONVERTING RECYCLED CARBON FIBER INTO DENSIFIED FIBERS

CROSS REFERENCE TO PRIORITY CLAIM

This application claims priority to U.S. 62/629,328 filed Feb. 12, 2018, the entire contents of which are hereby incorporated by reference in its entirety.

TECHNICAL FIELD

Example embodiments generally relate to recycled composite fibers, and more particularly, relate to the processing of such fibers in order to render them more suitable for reuse.

BACKGROUND

Pre-impregnated composite fibers are expensive fibers because of the raw materials used and the process parameters involved in the manufacturing of the fibers. Generally, during the manufacturing of parts or objects from pre-impregnated composite fibers, a significant amount of cut-off waste is generated. The cut-off waste is typically disposed in landfills, thereby wasting a portion of the expensive fibers and contributing to environmental concerns associated with dumping waste in landfills.

In order to avoid such waste, the recycling of such fibers became a priority since the relatively expensive fibers, if recovered efficiently, could potentially be used in other industries, such as the automobile industry, sporting industries, shipping, and so on. Although some methods for recycling have been proposed, even the more efficient recycling processes tend to result in clumps of recycled fibers that are not particularly suitable for reuse in most of the industrial applications mentioned above due to their low bulk density. Accordingly, it may be desirable to define ways to process the fibers to increase their bulk density to the point where the recycled fibers can more easily and efficiently be incorporated into products.

BRIEF SUMMARY OF SOME EXAMPLES

An example embodiment may provide a system for densification of recycled pre-preg fibers. The system may include a cutting device configured to receive the recycled pre-preg fibers having various lengths, and cut the recycled pre-preg fibers to produce cut fibers having a desired length, and a mixer configured to mix wetted, cut fibers to generate bound fibers having an increased bulk density relative to a bulk density of the cut fibers.

In an example embodiment, a method of densification of recycled pre-preg fibers is provided. The method may include receiving the recycled pre-preg fibers having various lengths, cutting the recycled pre-preg fibers to produce cut fibers having a desired length, wetting the cut fibers, and mixing the wetted, cut fibers to generate bound fibers having an increased bulk density relative to a bulk density of the cut fibers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
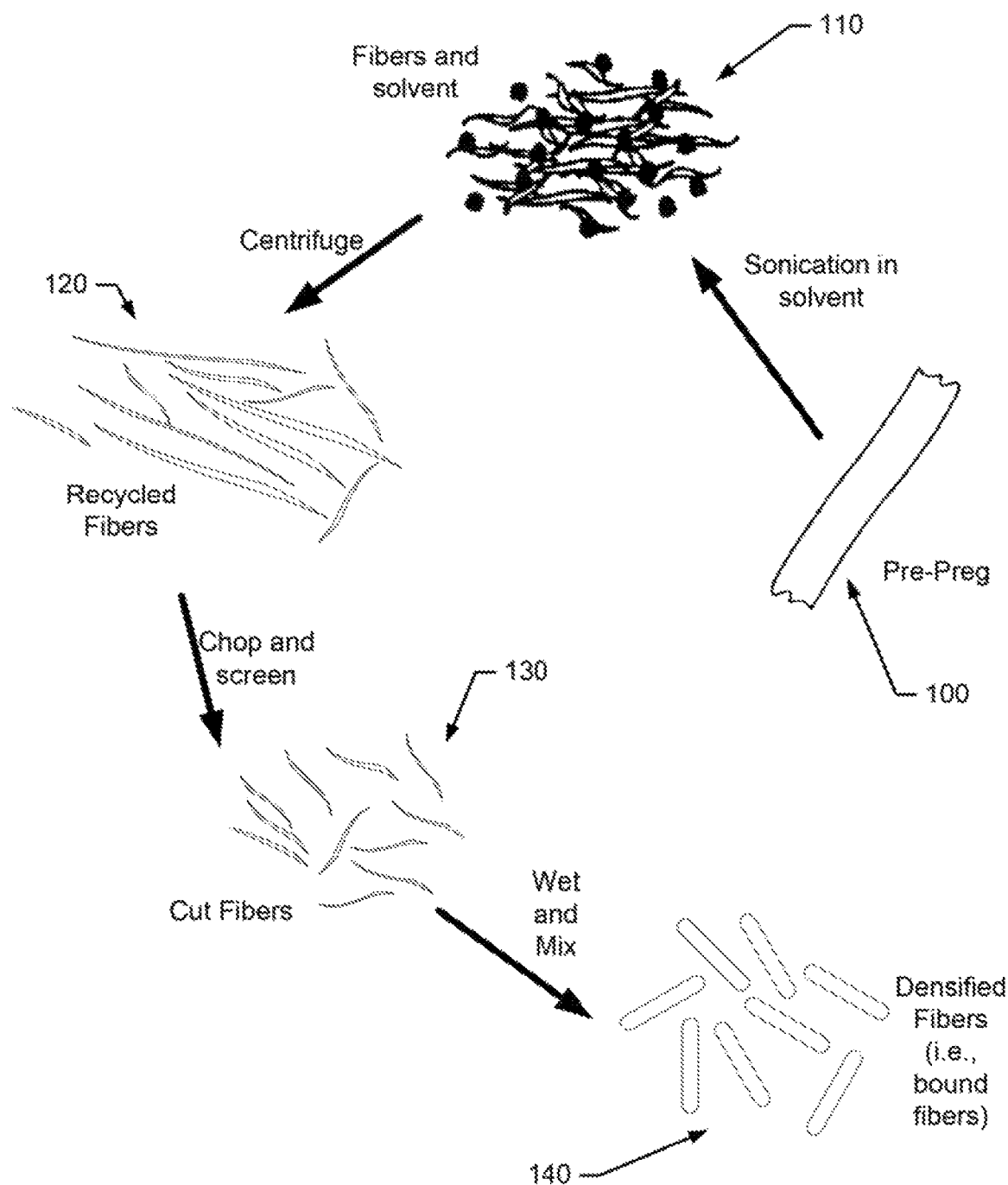
FIG. 1 illustrates a cycle of the stages of material associated with densifying fibers in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments disclosed herein may allow for the recovery of the expensive composite fibers, and the subsequent processing of such fibers in order to increase bulk density and enable easy mixing of such fibers to enable their subsequent use in follow-on manufacturing activities. Pre-impregnated composite fibers are composite material fibers that already have resins present in their structure. These pre-impregnated composite fibers are sometimes referred to as "pre-preg" fibers. The fibers themselves are usually woven or unidirectional fibers. Pre-preg fibers generally already contain some amount of matrix material or resin that is used to bind carbon fibers together for a particular use or application.

In order to recover pre-preg fibers for subsequent reuse, various systems or methods could be employed. In a typical situation, the pre-preg fibers may have resin that is only partially cured, in order to allow for easier handling. This material may be referred to as "B-Stage" material, and typically requires cold storage in order to prevent complete curing of the resin. B-Stage pre-preg is stored in cooled areas and then complete polymerization is performed by adding heat in a curing oven.

During the manufacturing process of parts made from pre-preg fibers, there tend to be large amounts of cut-off waste portions generated. These cut-off waste portions generally end up in landfills and represent a waste of expensive fiber materials. In order to reduce the amount of expensive fiber waste, more efficient methods of fiber recycling have been sought, which could perhaps recycle the fibers in these cut-off waste portions that would otherwise be discarded. According to one useful method of fiber recycling, sound energy is applied to these materials while the materials are disposed in a solvent bath. The sound energy separates the resins from the fibers in the presence of the solvent with greater efficiency. The fibers are then placed in a centrifuge to further facilitate separation, and also to recover excess solvent and some resin from the fibers. The fibers that result from this recycling process (i.e., out of the centrifuge) tend to be clumps of fibers having a low bulk density and a variety of different fiber lengths. Fibers of this type tend to mix very poorly with various thermoset and thermoplastic resins, and therefore are far less useful for consideration in manufacturing of other value added products.

Example embodiments may directly address this issue by increasing bulk density and creating greater consistency in the fiber lengths. Moreover, as will be seen below, the creation of consistency in fiber lengths can actually be helpful in facilitating the increase in bulk density. In this regard, to at least some degree, the method of densifying fibers that is described herein is enhanced by the fact that the fibers are more consistent in terms of their length when densification is commenced.

Figure 2:
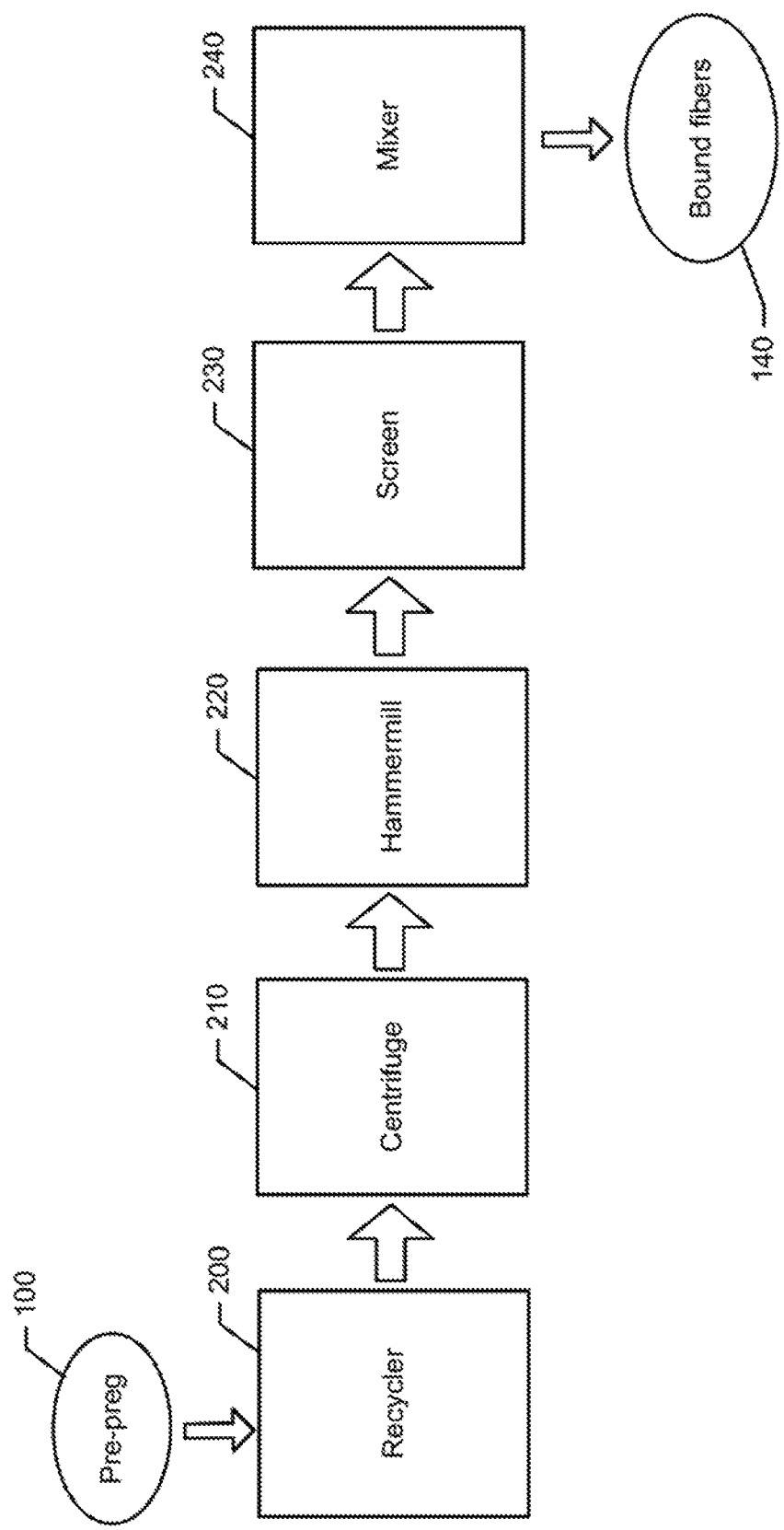
FIG. 2 illustrates a block diagram of various components or apparatuses that may be used at each respective stage shown in FIG. 1 in accordance with an example embodiment.

FIG. 1 illustrates a cycle of the stages of material associated with densifying fibers in accordance with an example embodiment. FIG. 2 illustrates a block diagram of various components or apparatuses that may be used at each respective stage. Referring now to FIGS. 1 and 2, the process of densification may begin with cut-off waste portions or pre-preg material 100. The pre-preg material 100 may be placed in a solvent and subjected to sonication in a recycler 200 to remove resins from the fibers of the pre-preg material 100 and therefor produce fibers and solvent 110. The pre-preg material 100 may include carbon fibers pre-impregnated with resin. The carbon fibers may take the form of a weave or may be unidirectional. The recycler 200 may receive the pre-preg material 100 along with enough solvent to completely cover the pre-preg material 100. The solvent may be an organic solvent such as dimethylformamide, N,N-dimethylacetamide, acetone, toluene, acetonitrile, hexane, tetrahydrofuran, or the like. The solvent type and the amount of solvent loaded into the recycler 200 may be based on a number of factors, such as the type of resins contained in the composite fibers, the weight of composite fibers to be loaded into the recycler 200, the approximate amount of resin contained within the composite fibers, etc. The solvent could be applied onto a loaded amount of pre-preg material 100, or the pre-preg material 100 could be provided into a prepared bath of solvent. The ordering of the loading of materials is flexible in various different example recycling methods.

The carbon fibers of the pre-preg material 100 may be a variety of shapes and sizes and may contain several different resins. Thus, as stated above, the type of solvent provided into the recycler 200 may depend on the types of resins that are to be separated from the carbon fibers of the pre-preg material 100. The recycler 200 may include an ultrasonicator or agitator that is used to apply one or more selected frequencies to the solvent and the pre-preg material 100 to cause sonication of the mixture. Sonication is the process of applying sound energy to agitate the solution contained within the recycler 200. The sonication process initiates and improves the process of resin removal from the carbon fibers and, in some cases, may also make the resin available for biofuel production or other applications. In some embodiments, the sound waves propagate through a liquid medium (e.g., the solvent) resulting in alternating high pressure and low pressure cycles thereby creating very high local temperatures and shear forces to remove the resin from the carbon fibers. The agitator or ultrasonicator of the recycler 200 may include an energy source by which sound energy in a range from 1 Hz to 100 GHz may be applied to the fiber-solvent mixture. Typically, the sound energy may be applied for time periods ranging from one second to sixty minutes. In some example embodiments, the recycler 200 may employ unique sonication "strategies" or "techniques" based upon the relationship of time, given frequencies, and other environmental parameters (e.g., manual agitation, pressure, or temperature). As such, for example, the recycler 200 may be configured to execute algorithms that control the different aspects associated with the application of the sonication process to the fiber-solvent mixture. In this regard, for example, the recycler 200 may be configured to define specific frequencies to apply at corresponding different times or in different sequences and/or define a specific time interval, sequence, frequency, or the like for specific fibers, resins, or fiber/resin combinations to ensure that substantially all the resin is effectively removed from the carbon fibers thereby resulting in, responsive to removal of the resin, a collection of fibers and solvent 110.

The fibers and solvent 110 may then be processed by a centrifuge 210 to produce recycled fibers 120 that are effectively dry and free of solvent. The recycled fibers 120 may come out of the centrifuge 210 in clumps that have a relatively low bulk density. Fibers having a low bulk density may not mix well with other thermoset and thermoplastic resins. Thus, as noted above, it may be desirable to increase bulk density. Accordingly, example embodiments may continue the processing of the recycled fibers 120 to produce fibers having a higher bulk density. At this point, it should also be noted that although a particular method of recycling was described above, any method of obtaining the recycled fibers 120 could be substituted in accordance with example embodiments. As such, example embodiments may begin with recycled fibers 120 (obtained by any means) and continue as described herein to increase the bulk density of the recycled fibers 120.

As shown in FIGS. 1 and 2, an increase in bulk density (i.e., densification) of the recycled fibers 120 may be accomplished by initially cutting the recycled fibers 120 to consistent lengths. In this regard, the recycled fibers 120 may have widely varying lengths (e.g., from 0.02 inches to 4 inches). As will be seen below, densification of the recycled fibers 120 may be enabled, at least in part, by the elimination of this wide difference in lengths of the recycled fibers 120. Accordingly, the recycled fibers 120 may be processed in a way that results in cut fibers 130 that have a more consistent length.

In some cases, the processing of the recycled fibers 120 to produce the cut fibers 130 may include a cutting device that may be configured to perform a chopping and/or screening process. Thus, for example, the cutting device may be embodied as a hammermill 220 that may be configured to chop the recycled fibers 120 to consistent lengths (e.g., a desired length). After processing by the hammermill 220, a screen 230 may be employed to filter an output of the hammermill 220 to further ensure separation of fibers and selection of fibers having the desired length. In this regard, the screen 230 may be configure to pass only those fibers that are smaller than a selected length. As such, any fibers that remain longer than the selected length may be removed from the screen and added to the next group of recycled fibers 120 being added into the hammermill 220. In this way, fibers that fail to meet the criteria for selection for continued processing are not wasted, but may have an opportunity, with a future batch of recycled fibers 120 that is being processed, to be passed on as cut fibers 130 that are processed for increasing bulk density.

The screen 230 may be a portion of the hammermill 220, or a separate component. Moreover, in some cases, a fiber chopping device other than the hammermill 220 may be employed. In this regard, any device or combination of devices that can reduce the length of the fibers to a consistent length may be employed. In an example embodiment, an output of the hammermill 220 and/or screen 230 (i.e., the cut fibers 130) may include separated material having between 1 to 100 filaments of carbon fiber that is cut to a length of between about 0.02 inches and 0.375 inches. In one example, a length of about 0.25 inches may be selected as the desired length.

The cut fibers 130 may therefore be relatively consistent in length (i.e., within a relatively small range of lengths), and be dry, prior to being fed into a mixer 240, where densification occurs. This consistency in length may enhance densification, as will be explained in greater detail below. The mixer 240 may be a high intensity mixer or rotating tumbler that is configured to apply a mixing or tumbling motion to the cut fibers 130 therein. However, prior to being rotated or tumbled in the mixer 240, the cut fibers 130 may be wetted (either in the mixer 240 or prior to entry into the mixer 240). The wetting may be accomplished with water or another liquid (e.g., a binder or binding material) that may enhance binding of individual carbon fiber filaments of the cut fibers 130 to bind to each other.

In an example embodiment, moisture (e.g., water or the binder) may be added to the cut fibers 130 either within the mixer 240 or, as noted above, prior to insertion of the cut fibers 130 into the mixer 240. In either case, the rotating or tumbling motion of the mixer 240 may cause the wetted, cut fibers to bounce off the interior of the mixer 240 rather than stick to or clump up on the interior of the mixer 240. In some embodiments, the moisture may be sprayed into the mixer 240, and the cut fibers 130 may be effectively wetted by rotation within the moisture inside the mixer 240.

A ratio of water to fibers, or of binder to fibers may be selected by the operator depending upon the bulk density values that are desired for a particular application. In this regard, the thermoset or thermoplastic resin with which the fibers are ultimately to be mixed with may dictate the ratio of water to fibers or the ratio of binder to fibers. Moreover, the type of binder that is used (if any) may be selected based on the desired bulk density and/or the thermoset or thermoplastic resin with which the fibers are ultimately to be mixed for the specific products into which the fibers are planned for inclusion. As such, for example, the binder may be selected to the specific end use that is desired, and more particularly, may be selected to be compatible with the resin that is to be used in the specific end use that is desired.

In an example embodiment, tumbling of the wetted, cut fibers within the mixer 240 may result in formation of bound fibers 140, which are substantially densified relative to the cut fibers 130 inserted into the mixer 240. In this regard, the bound fibers 140 may form rice grain-type pellets that have a desired bulk density. The bound fibers 140 may be free flowing when mixed with resin. In other words, when the grains or pellets of the bound fibers 140 are mixed with pellets or grains of the resin, the mixture may be relatively easy to mix in desired ratios with relatively predictable and even ratios throughout the mixture. The corresponding composite material products formed in final treatment and curing may therefore be relatively consistent and high quality materials.

Densification is more efficient when preformed relative to the cut fibers 130, due to the cut fibers 130 having similar lengths, and being wetted. Otherwise, the fibers may bind together to form webs of material that are less dense, and also not free flowing. However, fibers that are wetted and have similar lengths tend to bind together better in the mixer 240 to form desirable bound fibers 140 that are free flowing. In this regard, the bound fibers 140 tend to have lengths also similar to the lengths of the cut fibers 130 (e.g., from about 0.02 inches to about 0.375 inches) and generally do not grow in length by any appreciable amount. This is due to the specific phenomena that occurs to form the bound fibers 140. FIGS. 3 and 4 illustrate the phenomena in greater detail.

Of note, the particular phenomena relates to the cohesive forces of water molecules (or other liquids that may be used as the binder) when in the presence of other water molecules. For example, surface tension may be formed between water molecules that wet fibers so that a wetted fiber is less likely to adhere to a non-wetted material (e.g., the walls of the mixer 240) than to another wetted fiber. However, the forces of adhesion that bind water molecules together may have to compete with the kinetic forces of the tumbling action created by the mixer 240. The adhesion of water molecules to each other is maximum when there is maximum surface area presented over which water molecules can experience cohesion. Thus, the mixer 240 may rotate at a speed that is selected to achieve binding of adjacent wetted fibers only when the wetted fibers approach each other in such a way as to present maximum surface area for adhesion to each other. In other words, the wetting of the fibers and the speed of the tumbling are balanced to ensure that binding of fibers occurs when the wetted fibers have a parallel collision with each other where lengths of the fibers are also substantially aligned.

Figure 3A:
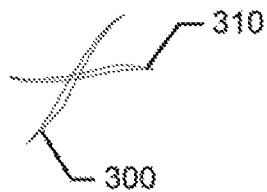
FIG. 3A illustrates a collision between fibers in a high intensity mixer where the fibers have an orientation that creates little fiber overlap during the collision according to an example embodiment.

In this regard, as shown in FIG. 3, which includes FIGS. 3A, 3B, 3C and 3D, a first wetted, cut fiber 300 may encounter a second wetted, cut fiber 310 in any of number of random orientations during tumbling within the mixer 240. FIG. 3A illustrates an interaction in which only the midsections of both the first wetted, cut fiber 300 and the second wetted, cut fiber 310 encounter each other during an interaction that occurs during tumbling within the mixer 240. In this interaction, only a very small surface area of the first and second wetted, cut fibers 300 and 310 encounter each other and the cohesion of the water molecules wetting each fiber is not sufficient to overcome the kinetic energy imparted by the mixer 240 on the fibers, so they effectively bounce off each other and continue to rotate and tumble within the mixer 240.

Figure 3B:
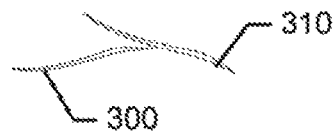
FIG. 3B illustrates a collision between fibers having a different orientation than that of FIG. 3A, but that also creates little fiber overlap during the collision according to an example embodiment.

FIG. 3B illustrates an interaction in which an end portion of the first wetted, cut fiber 300 strikes a middle portion (or end portion) of the second wetted, cut fiber 310. In this example also, only a very small surface area of the first and second wetted, cut fibers 300 and 310 encounter each other. Accordingly, the cohesion of the water molecules wetting each fiber is not sufficient to overcome the kinetic energy imparted by the mixer 240. Again, the first and second wetted, cut fibers 300 and 310 effectively bounce off each other and continue to rotate and tumble within the mixer 240.

In both FIGS. 3A and 3B, the first and second wetted, cut fibers 300 and 310 approached each other such that their longitudinal directions of extension are at an angle relative to each other (i.e., they are not parallel to each other). These situations will generally result in a failure of the first and second wetted, cut fibers 300 and 310 to bind to each other. However, it is also possible for the first and second wetted, cut fibers 300 and 310 to fail to bind to each other when parallel interactions occur.

Figure 3C:
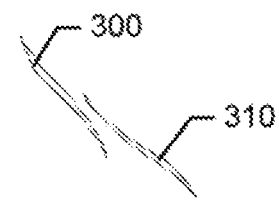
FIG. 3C illustrates a collision between fibers having still another different orientation with more fiber overlap, but still not enough to facilitate binding according to an example embodiment.

FIG. 3C illustrates another possible interaction, this time the first and second wetted, cut fibers 300 and 310 approached each other with little to no angle therebetween. In other words, the first and second wetted, cut fibers 300 and 310 are substantially parallel to each other. However, their lengths are not aligned so that it is only end portions of the first and second wetted, cut fibers 300 and 310 that contact each other in the collision. In this collision as well, the kinetic energy of the first and second wetted, cut fibers 300 and 310 is greater than the forces of cohesion between the first and second wetted, cut fibers 300 and 310. Thus, no binding occurs.

Figure 3D:
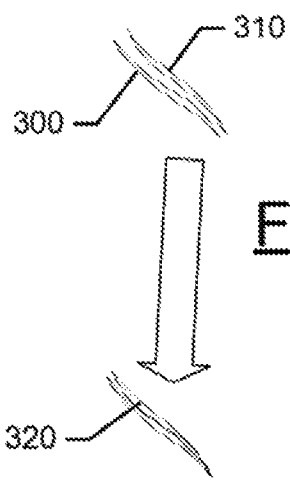
FIG. 3D illustrates a collision between fibers where sufficient fiber overlap is provided to overcome kinetic energy associated with mixing and result in binding of fibers responsive to the collision according to an example embodiment.

However, as shown in FIG. 3D, when the first and second wetted, cut fibers 300 and 310 approach each other with ends substantially aligned and parallel to each other, the forces of cohesion between the first and second wetted, cut fibers 300 and 310 (particularly between the water molecules on each respective fiber) are sufficient to overcome the kinetic energy of the first and second wetted, cut fibers 300 and 310 caused by the mixer 240. In particular, since the respective ends of the first and second wetted, cut fibers 300 and 310 are proximate to each other when the collision occurs, and the first and second wetted, cut fibers 300 and 310 are also parallel to each other, the surface area over which the water molecules on each of the first and second wetted, cut fibers 300 and 310 experience cohesion toward each other is maximized. Thus, the first and second wetted, cut fibers 300 and 310 may bind to each other to form bound fibers 320. The bound fibers 320 may then be available for continued interaction with other wetted fibers and/or bound fibers. However, the same general principles apply for collisions that occur subsequent to binding of one set of fibers until the numbers of bound fibers build up to form grains or pellets of bound fibers.

Figure 4A:
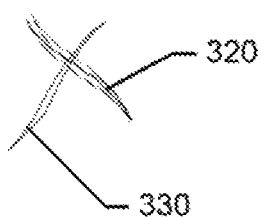
FIG. 4A illustrates a collision between a fiber and a group of bound fibers with similar geometry to that of FIG. 3A according to an example embodiment.
Figure 4B:
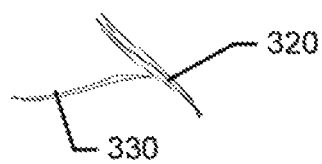
FIG. 4B illustrates a collision between a fiber and a group of bound fibers with similar geometry to that of FIG. 3B according to an example embodiment.
Figure 4C:
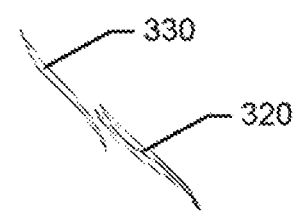
FIG. 4C illustrates a collision between a fiber and a group of bound fibers with similar geometry to that of FIG. 3C according to an example embodiment.

In this regard, FIGS. 4A, 4B and 4C each illustrate collisions under similar circumstances to those shown in FIGS. 3A, 3B and 3C, respectively, except that a third wetted, cut fiber 330 approaches the bound fibers 320 in the corresponding collision geometries explained in FIG. 3. As can be seen in FIG. 4, which is defined by FIGS. 4A, 4B, 4C and 4D, collisions that occur between fibers at angles relative to each other generally do not result in binding. In this regard, the third wetted, cut fiber 33 does not bind with the bound fiber 320 of FIGS. 4A and 4B due to the small surface area of contact between water molecules on the colliding objects. Moreover, collisions that are between parallel fibers that are not aligned linearly such that each of their respective ends are proximate to each other (as in FIGS. 3C and 4C, where only a small amount of overlap occurs) also generally do not result in binding. However, when the third wetted, cut fiber 330 approaches the bound fibers 320 such that the third wetted, cut fiber 330 and the bound fibers 320 are generally parallel to each other and respective ends are generally aligned with each other (i.e., the fibers are aligned linearly with respective ends proximate to each other), the cohesion forces of the water molecules on the third wetted, cut fiber 330 and the bound fibers 320 are sufficient to overcome the kinetic energy of the fibers and binding occurs due to the large amount of surface area over which the cohesive forces act. Then, as shown in FIG. 4D, the third wetted, cut fiber 330 and the bound fibers 320 may bind together to form compound bound fiber 340.

As can be appreciated from the description above, additional collisions that may occur between the compound bound fiber 340 and fibers that are linearly aligned therewith and parallel thereto may occur. These collisions may also result in further compound bindings to form the pellets or grains described above. Of note, because the bindings generally occur only when the contact surface area between fibers is maximized, the overall length of the pellets or grains may be relatively consistent with the lengths of the fibers (e.g., at a selected length from about 0.02 inches to 0.375 inches such as, for example, 0.25 inches). However, since slight misalignments of the ends of the fibers may still result in relatively large contact surface areas between fibers, binding may still occur between fibers that are not necessarily perfectly aligned. As such, some growth in the lengths of bound fibers and compound bound fibers may occur. In various example embodiments, the lengths of the grains or pellets that form from compounding of bound fibers may remain less than about 5% to about 10% longer than the range of lengths of the fibers.

It should also be appreciated that inside the mixer 240, a multitude of collisions of fibers are likely to occur during tumbling. Moreover, of these many collisions, the vast majority will have alignments similar to those shown in FIGS. 3A, 3B, 3C, 4A, 4B, and 4C, and only relatively small numbers of collisions will have alignments similar to those shown in FIGS. 3D and 4D. However, even in situations where alignments like those of FIGS. 3D and 4D occur at the time of collision, it would be even more rare that the fibers are approaching each other by moving in equal and opposite directions. Instead, at the point of collision, one or each fiber may have some form of momentum that tends to represent a twisting action relative to the other fiber. As such, when collisions occur involving some form of twisting action, at least one of the fibers may tend to wrap around the other fiber to at least some degree. This form of binding, involving a twisting action at impact, may actually form even stronger bonds that a binding of fibers that approach each other from equal and opposite directions and are perfectly aligned. Through the tumbling process that occurs within the mixer 240, many random collisions occur and result in the bindings described above, thereby increasing the bulk density of the contents of the mixer 240 through the bindings of the carbon fibers therein.

Figure 4D:
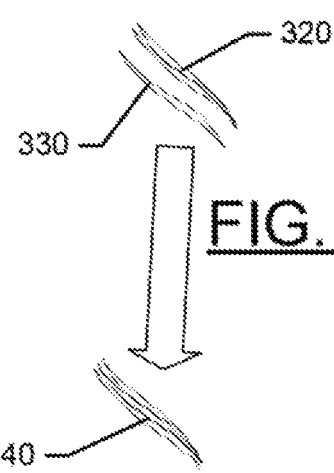
FIG. 4D illustrates a collision between a fiber and a group of bound fibers with similar geometry to that of FIG. 3D, thereby resulting in compound binding according to an example embodiment.

As mentioned above, a proper balance is sought between kinetic energy of the wetted, cut fibers in the mixer 240 and the forces of cohesion of the water molecules on the fibers so that binding only occurs when alignments such as those shown in FIGS. 3D and 4D are present. This balance is potentially different for corresponding different fibers (e.g., in terms of length and/or material composition). The balance may also change for different degrees of wetness, and/or for different binders (other than or in addition to water). Accordingly, in some cases, the mixer 240 may have a variable speed, and the speed may be adjusted until bindings occur and generate the desired grain or pellet shape and size. In this regard, if operation of the mixer 240 generates webs of bound materials, or pellets or grains that have substantially longer lengths (i.e., greater than 5% to 10% longer) than the lengths of the cut fibers 130, the speed of the mixer 240 may be increased. Conversely, if the numbers of bindings are too low and excessive mixing still fails to produce substantial increases in bulk density, the speed of the mixer 240 may be reduced. Eventually, and after a relatively short period of operation of the mixer 240, the proper speed may be determined for a given set of ingredients and conditions. The resulting grains or pellets may then also be free flowing and well suited for mixing with selected thermoset or thermoplastic resins to produce composite materials for use in product manufacturing.

Figure 5:
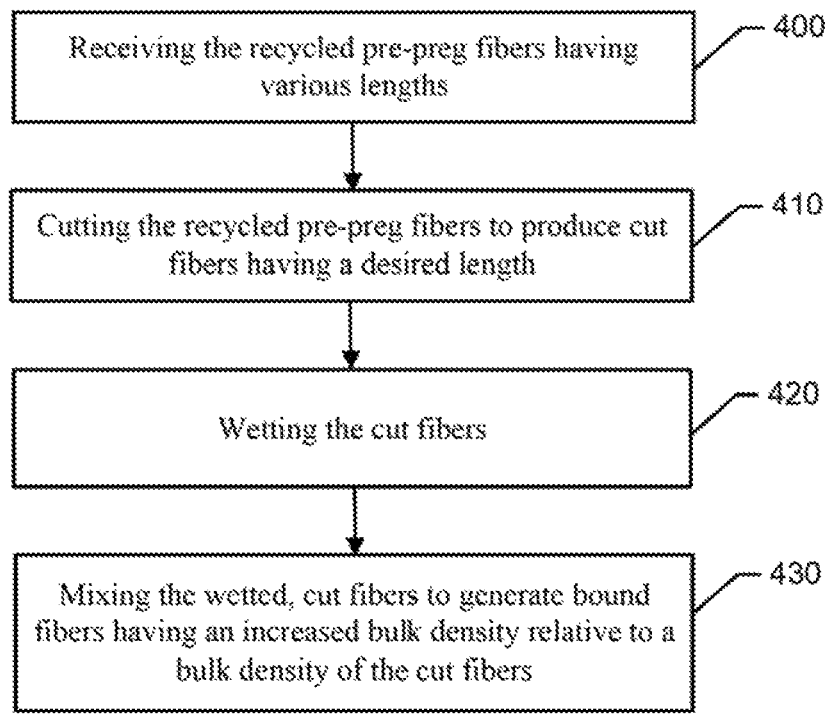
FIG. 5 illustrates a block diagram of a method of densifying recycled pre-impregnated fibers according to an example embodiment.

FIG. 5 illustrates a block diagram of a method of densification of recycled pre-impregnated fibers. As shown in FIG. 5, the method may include receiving the recycled pre-preg fibers having various lengths at operation 400 and cutting the recycled pre-preg fibers to produce cut fibers having a desired length at operation 410. The method may further include wetting the cut fibers at operation 420 and mixing the wetted, cut fibers to generate bound fibers having an increased bulk density relative to a bulk density of the cut fibers at operation 430.

In some embodiments, the method (and corresponding apparatus or system in or with which the method may be performed) may be configured to include additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, wetting the cut fibers may include wetting the cut fibers in a high intensity mixer or before insertion into the high intensity mixer. In some cases, cutting the recycled pre-preg fibers may include cutting the recycled pre-preg fibers in a hammermill. In an example embodiment, the method may further include passing the cut fibers through a screen configured to pass cut fibers having the desired length. In this regard, for example, the desired length may be a length selected in a range from about 0.02 inches to about 0.375 inches. In some cases, mixing the wetted, cut fibers may include mixing the wetted, cut fibers in a variable speed mixer. In an example embodiment, the bound fibers may form grains or pellets having a length less than 10% longer than the desired length. In some embodiments, the method may further include an initial operation of removing resin from the recycled pre-preg fibers via sonication in a solvent bath prior to the cutting of the recycled pre-preg fibers. In some cases, the method may also further include removing the solvent from the recycled pre-preg fibers in a centrifuge prior to the cutting of the recycled pre-preg fibers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of densification of recycled pre-preg fibers, the method comprising:
    removing resin from pre-preg material via sonication in a recycler to extract recycled pre- preg fibers from the pre-preg material;
    receiving the recycled pre-preg fibers having various lengths and a first bulk density;
    cutting the recycled pre-preg fibers to produce cut fibers having a desired length;
    wetting the cut fibers with water; and
    mixing the wetted, cut fibers to generate bound fibers having a second bulk density that is increased relative to the first bulk density of the cut fibers,
    wherein cutting the recycled pre-preg fibers comprises cutting the recycled pre-preg fibers in a hammermill,
    wherein the method further comprises passing the cut fibers through a screen configured to pass cut fibers having the desired length after cutting the recycled pre-preg fibers in the hammermill to achieve the desired length of about 0.02 inches to about 0.375 inches, and
    wherein the cut fibers are wetted with water prior to mixing to bind only parallel fibers aligned linearly with respective ends proximate each other to form the bound fibers.

2. The method of claim 1, wherein wetting the cut fibers comprises wetting the cut fibers in a rotating tumbler.

3. The method of claim 1, wherein wetting the cut fibers comprises wetting the cut fibers before insertion in rotating tumbler.

4. The method of claim 1, wherein mixing the wetted, cut fibers comprises mixing the wetted, cut fibers in a variable speed mixer.

5. The method of claim 1, wherein the bound fibers form grains or pellets having a length less than 10% longer than the desired length.

6. The method of claim 1, wherein removing resin from the recycled pre-preg fibers via sonication comprises performing the sonication in a solvent bath prior to the cutting of the recycled pre-preg fibers.

7. The method of claim 6, further comprising removing the solvent from the recycled pre-preg fibers in a centrifuge prior to the cutting of the recycled pre-preg fibers.

8. The method of claim 1, wherein a thermoset or thermoplastic resin is mixed with the recycled pre-preg fibers.

* * * * *